Nov. 17, 1936.  J. N. HINCKLEY ET AL  2,060,937
ROTARY ENGINE
Filed Jan. 18, 1933    4 Sheets-Sheet 3

Inventors
John N. Hinckley and
Hanley H. Clark.
by Kenway & Witter
Attorneys

Nov. 17, 1936.  J. N. HINCKLEY ET AL  2,060,937
ROTARY ENGINE
Filed Jan. 18, 1933  4 Sheets-Sheet 4
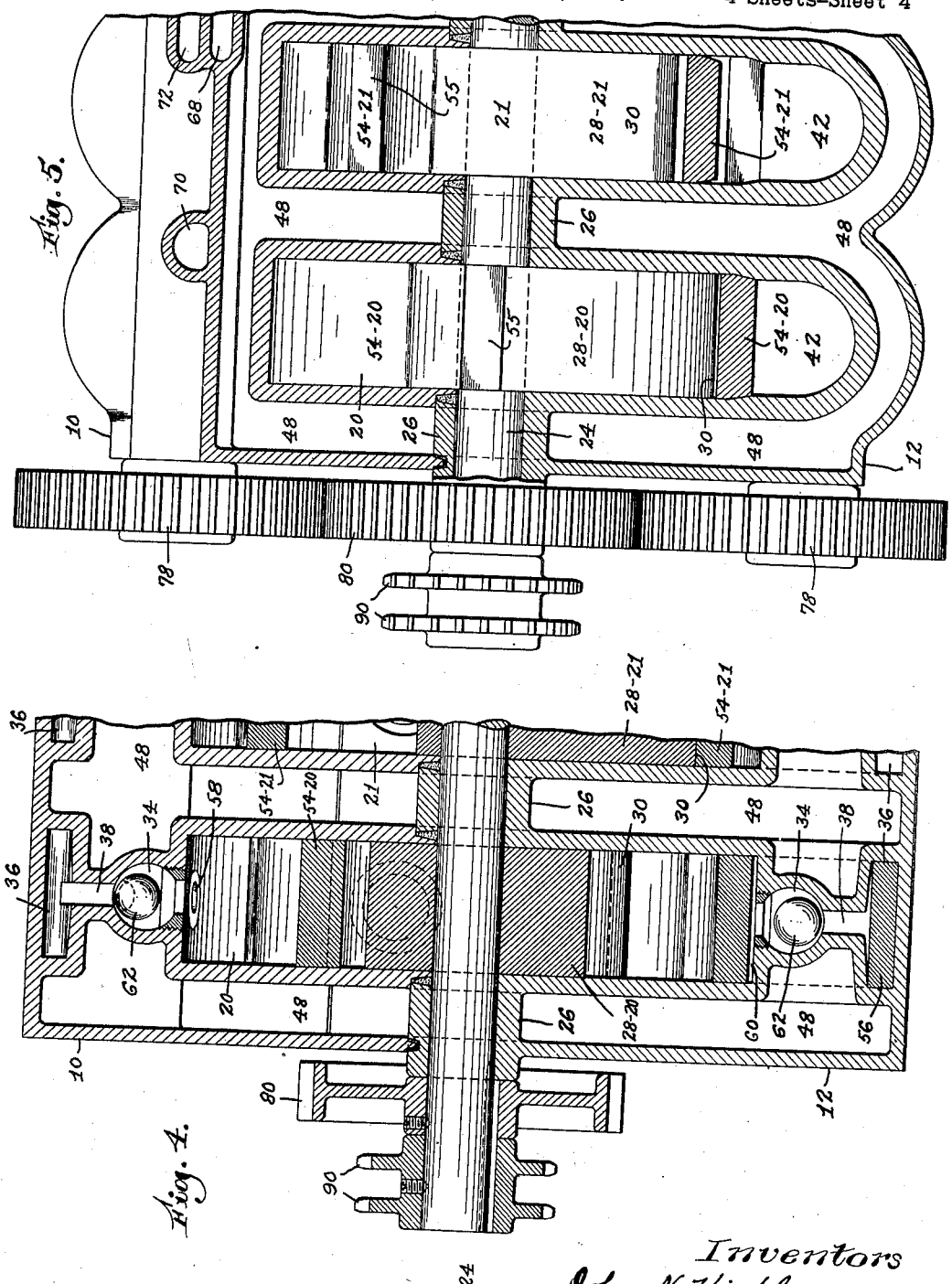
Inventors
John N. Hinckley and
Stanley H. Clark
by Henway & Witter
Attorneys Patented Nov. 17, 1936

2,060,937

UNITED STATES PATENT OFFICE 2,060,937

ROTARY ENGINE

John N. Hinckley, Cambridge, Mass., and Stanley H. Clark, Provo, Utah

Application January 18, 1933, Serial No. 652,338

10 Claims. (Cl. 123—15)

This invention relates to internal combustion engines of the rotary type and the primary object of the invention is to produce an improved engine of this nature which is of relatively simple construction and reliable in operation, which will function with maximum efficiency and balanced action and with a minimum of vibration, and which will require a minimum of space and weight in proportion to the power generated.

Our improved engine includes as an important feature novel mechanism for drawing in, compressing and delivering the explosive charges to the combustion chambers and for scavenging the burned gases from the cylinders. Compression and combustion chambers are formed within the cylinder walls and cooperating means is provided for compressing explosive charges within the compression chambers and delivering the same to the combustion chambers automatically and synchronously as the engine operates. The flow of the explosive charges and the exhaust gases is automatically controlled by suitably arranged valve mechanisms and the compressing and delivering functions are conveniently and efficiently brought about through the use of movable arms or segments in the cylinders, all of which is hereinafter more specifically described.

These and other features of the invention will be best understood and appreciated from the following description of a preferred embodiment thereof, selected for purposes of illustration and shown in the accompanying drawings, in which Fig. 1 is a side elevation of a rotary engine embodying our invention;

Fig. 4 is a fragmentary plan sectional view taken on line 4—4 of Fig. 2;

Fig. 5 is a fragmentary sectional view taken on line 5—5 of Fig. 2; and

In the accompanying drawings, we have illustrated our improved engine as embodying three cylinders formed within a shell or block constructed of two half sections 10 and 12. The construction of the block in this manner provides convenience in molding and machining, and the assembling of these two sections together against a gasket 14, by means of bolts 16, is a relatively simple operation. Furthermore, the fact that the sections 10 and 12 are identical and symmetrical in construction provides for economy in manufacture. The three cylinders formed within the shell are consecutively designated by numerals 20, 21 and 22.

Figure 1:
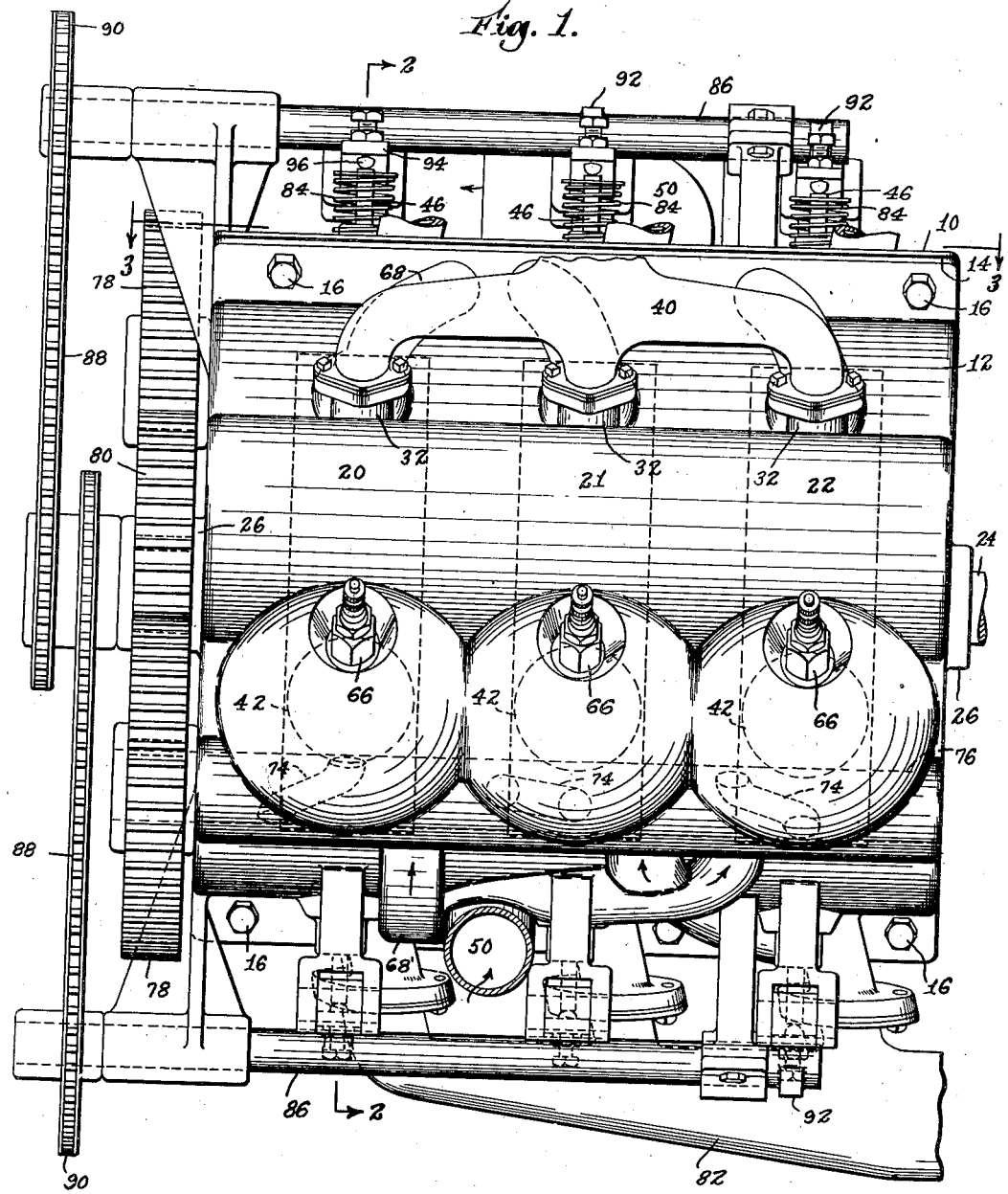
Figure 2:
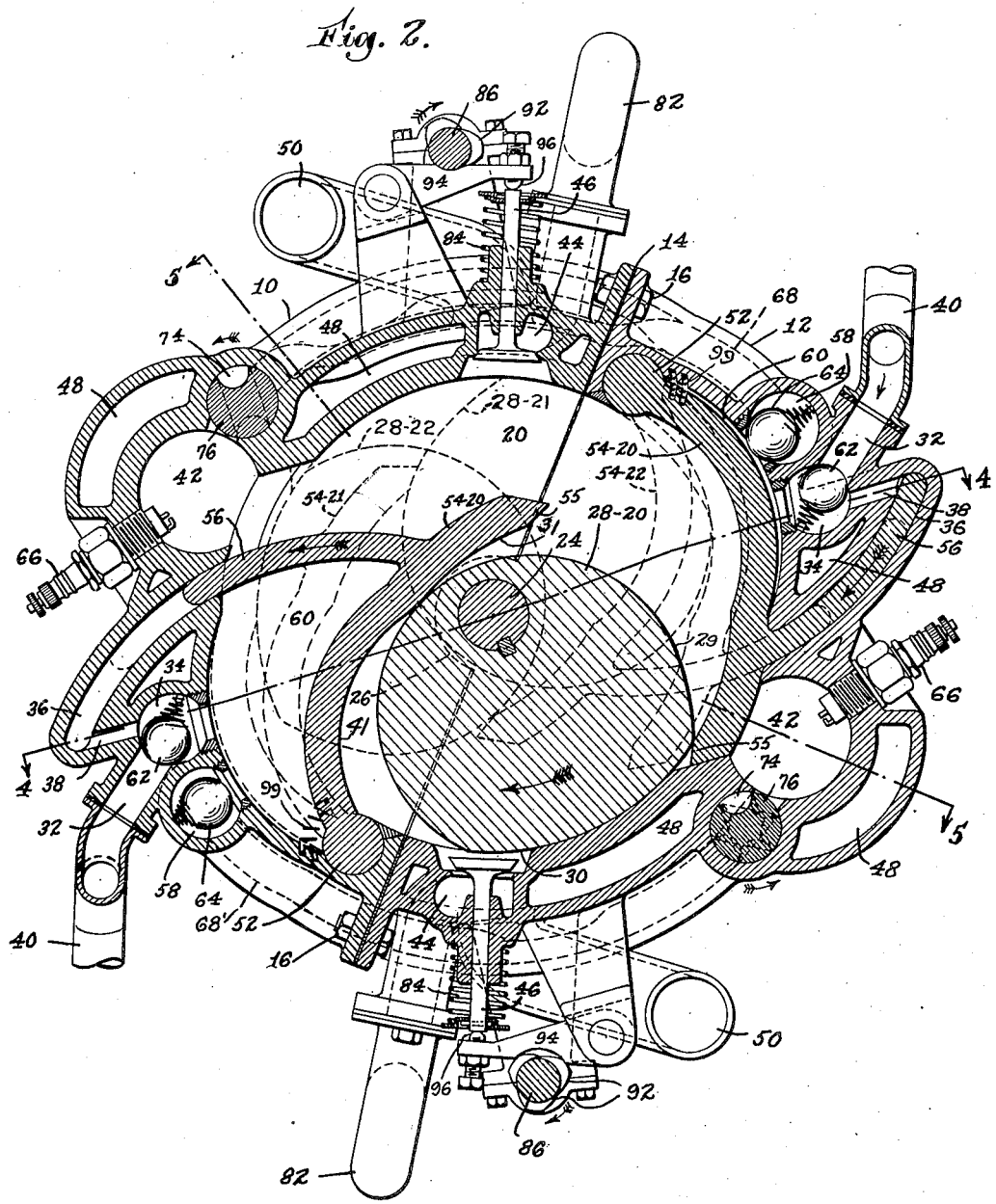
Fig. 2 is a vertical sectional view therethrough on line 2—2 of Fig. 1.

The three cylinders are in alignment and a shaft 24, carried in bearings 26, is disposed centrally through all of the cylinders. Three eccentrically mounted rotors 28 are provided on the shaft and respectively in the three cylinders, and are consecutively spaced 120° apart around the shaft. Each rotor is in contact with the side walls of its cylinder, as shown in Fig. 4, and the outer peripheral surface 30 thereof is concentric of the shaft 24 and is of a radial dimension to contact with the peripheral wall of the cylinder. Each rotor also has a second curved peripheral portion 29 extending from the portion 30 inwardly of the cylinder and around the shaft 24. This peripheral portion 29 is composed of two substantially circular arcs and its extent is greater than 180°. It will furthermore be noted that the innermost point of the periphery 29 closely approaches the shaft 24 and that substantially equal parts of the periphery 29 are located on opposite sides of this point. In Fig. 2, the three rotors 28 in the three cylinders 20, 21 and 22 are respectively indicated by reference characters 28—20, 28—21 and 28—22.

Each section 10 and 12 has formed within its wall a gas intake port 32 and compression chamber portions or branches 34 and 36 connected by a port 38, an intake manifold 40 being connected to each port 32. Also formed within the wall of each section adjacent to each cylinder is a combustion chamber 42 and an exhaust port 44, the latter being provided with a valve 46 for controlling the exit of the exhaust gases. When the two sections are assembled together, the said chambers and ports in each section are diametrically opposite to the corresponding chambers and ports in the other section. The sections are also cored out at 48 to provide a water-cooling jacket adjacent to the cylinders and chambers and which jacket may be connected to a radiator through inlet and outlet manifolds 50.

Pivotally mounted on the wall of each cylinder section at 52 is a segmental compression arm 54, adapted in its closed position to rest against the cylinder wall and in its open position to extend inwardly into the cylinder, the arms being in contact with the end walls of the cylinders, as shown in Figs. 4 and 5. An outwardly-extending projection 56 on each arm fits closely within the adjacent chamber portion 36, and in the closed position of the arm this projection entirely fills the chamber portion and the arm closes the opening from the chamber 42. The inner faces of the arms are constructed to cooperate with the peripheries of the rotors, as shown in Fig. 2. Each arm in its open position and the adjacent cylinder wall form the main portion 60 of a compression chamber in communication with chamber portions 34—36—38. Each arm, also in its open position, and the adjacent walls of the cylinder and rotor form an expansion chamber in communication with the combustion chamber 42. Valves, such as the spring-pressed balls 62 and 64, are provided within the chamber 34 and port 58, the former permitting gas to be drawn into the compression chamber and the latter permitting the compressed charge to pass outwardly through the port 58. The arms are preferably located at opposite sides of the vertical axis through the engine, whereby gravity will have a minimum effect upon the swinging of the arms.

Figure 3:
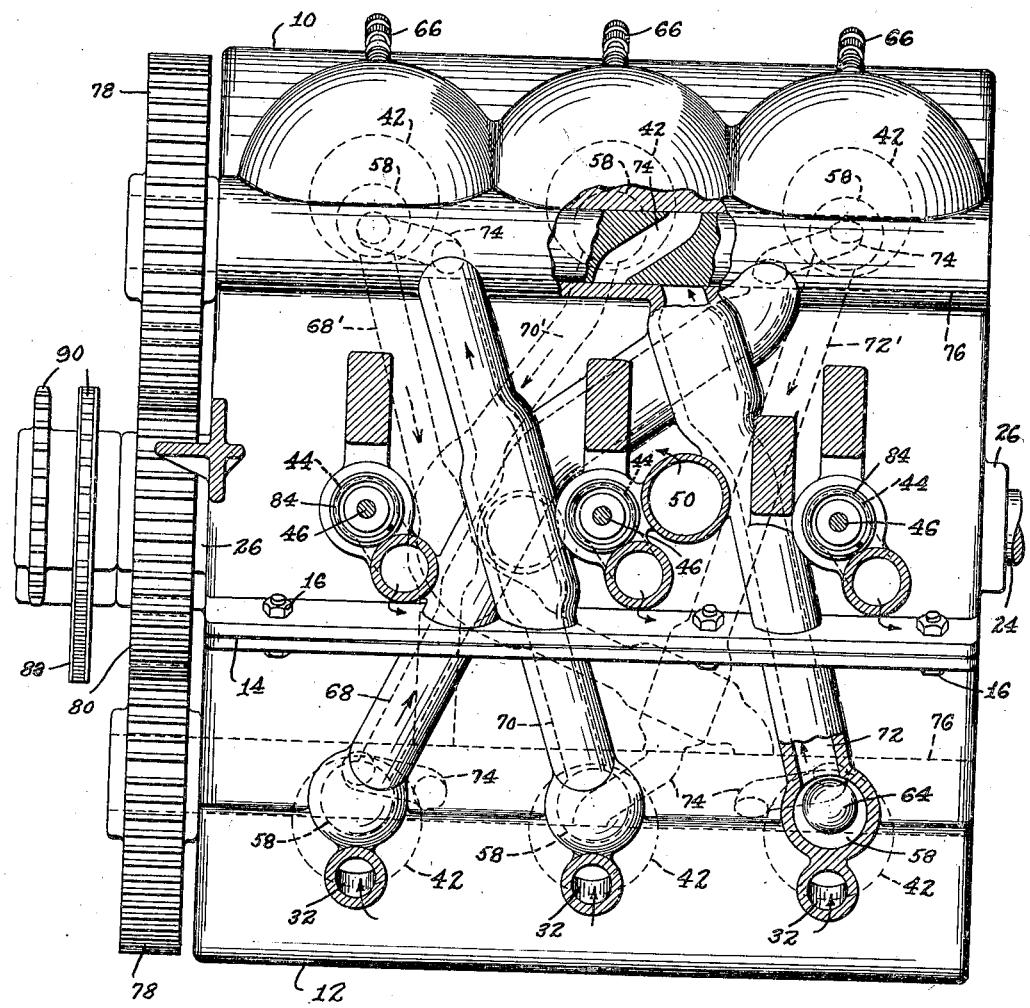
Fig. 3 is a plan sectional view taken on line 3—3 of Fig. 1, certain portions thereof being illustrated as partially broken away.

It will now be seen that, in the engine as herein illustrated, each of the three cylinders is provided with two arms 54, two compression chamber portions 34—36—38 and two combustion chambers 42. As the shaft 24 is rotated in the direction of the arrow (Fig. 2) under the expanding action of the gases ignited by means of spark plugs 66 within the combustion chambers, the arms follow their rotors and are thus moved to and from the open and closed positions, shown in full lines in Fig. 2. The inward pivotal movement of each arm draws a charge of gas from the manifold 40 into the compression chamber 60 and 36. When the arm is moved in the closing direction, this charge is compressed within the port 58 and the connected piping and is led to a combustion chamber of another cylinder, as hereinafter described. A combustion charge is ignited within each combustion chamber at each rotation of the shaft 24, thus providing six explosions for each rotation of the shaft, and these are so timed that an ignition takes place at each 60° rotation of the shaft. Furthermore, the consecutive explosions take place alternately at opposite sides of the engine and in alternate cylinders. In order to provide for this timing and for the proper arrangement of the ignitions, the compressed charges are distributed in the manner best illustrated in Figs. 2 and 3 and now to be described.

The charges compressed by the arms 54—20 in the cylinder 20 are carried to the corresponding top and bottom combustion chambers 42 located respectively on opposite sides of the cylinder 22 by pipes 68 and 68'. The charges compressed by the arms 54—21 in the cylinder 21 are likewise carried to the corresponding top and bottom combustion chambers 42 of the cylinder 20 by pipes 70 and 70'. The charges compressed by the arms 54—22 in the cylinder 22 are carried to the corresponding top and bottom combustion chambers 42 of the cylinder 21 by pipes 72 and 72'. Rotary valves in the nature of ports 74 through two shafts 76 are provided between the combustion chambers and the said pipes, these valves being operated automatically and synchronously from intermeshing gears 78 and 80 on the shafts 76 and 24.

The exhaust ports 44 are in communication with exhaust manifolds 82 and their valves 46 are normally held in closed position by springs 84. The opening of these valves in proper sequence is effected through shafts 86, driven from the shaft 24 through chains 88 on sprockets 90 on the shafts 24 and 86, cams 92 on the shafts 86 acting against pivoted elements 94 and having adjustable stops 96 engaging the valve stems.

The operation of the engine may be briefly described as follows.

As illustrated in Fig. 2, the right-hand compression arm 54—20 of cylinder 20 is in the fully closed position, in which it seals the opening into the adjacent combustion chamber 42, and an ignition is about to occur in this chamber. The left-hand arm is being closed by the rotation of the rotor 28—20 and the charge of gas outwardly thereof in the chamber 60 is being compressed, it being understood that the expanding gases in the expansion chamber at the top of the cylinder illustrated in Fig. 2 are driving the rotor forwardly. The other rotors 28—21 and 28—22 and their cooperating arms 54—21 and 54—22 are in the positions indicated by broken lines in Fig. 2. Ignition of the charge in the said right-hand chamber 42 causes its arm 54—20 to be driven inwardly against the rotor 28—20 and the expanding of the burning gases in the expansion chamber continuously forces the arm against the periphery 29 of the rotor, and this force, along with the direct action of the gases against the rotor, drives the rotor and its shaft 24 forwardly in the direction of the arrow. During this operation, the arm consecutively takes the positions in which the arms 54—21 and 54—22 are illustrated (Fig. 2) and the portion of the cylinder in communication with the chamber 42 serves as an expanding chamber for the burning gases. The right hand arm 54—20 continues to move inwardly until it contacts with that point on the periphery 29 closest to the shaft axis, and the rotor then acts to force the arm outwardly and compress the charge within the chamber 60 and close the arm over the opening into the combustion chamber 42. The long continuous curve at 29 thus gives a smooth and maximum operation to the arm, as will be understood, and provides for great efficiency in driving the rotor from the expanding gases. It will furthermore be understood that the expanding gases act directly on the portion of rotor face 29 uncovered by the arm and thereby continue to drive the rotor forwardly even when the arm is being moved outwardly (see Fig. 2).

As above pointed out, inward movement of the arm, acting against the rear portion of the periphery 29 of the rotor, drives the rotor forwardly and the action of the forward portion of said periphery 29 on the surface 41 of the arm thereafter moves the arm outwardly to compress the charge within the chamber 60. It will be noted that each arm is of such greater length than the distance between its pivotal axis and the rotary axis of the shaft 24 that its outer end portion drives the rotor by engaging the rear portion of the periphery 29 at a point considerably in advance of or beyond the shaft axis, and the arm is thereafter moved outwardly by the engagement of the forward portion of the periphery 29 with the inner portion 41 of the arm more adjacent to the pivotal axis 52. Thus, upon its power stroke, the arm engages the rotor at a point substantially beyond the shaft 24 and upon the compression stroke the rotor engages the arm between the shaft and pivotal axis of the arm. Such arrangement serves the function of utilizing the pressure of the arm on the rotor to drive the rotor forwardly during a relatively long stroke, and furthermore provides for a greater driving area of and a longer driving period for the expanding gases on the rotor, it being apparent from Fig. 2 that the length and shape of the arm exposes a long driving area 29 for the action of the expanding gases on the rotor. The net result is a long driving stroke on the rotor by both the arm and gas pressure thereagainst and this driving force is substantially continuous since the expanding gases from each impulse continue to act on the rear portion of the periphery 29 up to the time the next impulse is started on the opposite side of the cylinder. It will furthermore be apparent from Fig. 2 that the forward end of the periphery 30 merges smoothly into the periphery 29, whereby the consecutive engaging of the peripheries 29 and 30 with the arm gives a smooth and uniform movement to the arm.

With the parts in the position of Fig. 2, it will be noted that the left-hand arm 54 in cylinder 22 is entirely closed and a charge of gas, compressed by the right-hand arm 54—20 of cylinder 20, has been delivered into its combustion chamber 42—22 through the pipe 68, the shaft 76 having been brought to a position providing an open port 74 from this pipe to said chamber. When the shaft 24 has rotated 60° from the ignition above stated, an ignition takes place in the left-hand combustion chamber 42—22. Ignitions follow consecutively in like manner in the combustion chambers 42—21 right, 42—20 left, 42—22 right, 42—21 left, 42—20 right and 42—22 left, compressed charges being delivered automatically and synchronously to the combustion chambers through the mechanism heretofore described and the spark plugs being operated in proper timed relation thereto in the conventional manner.

The inner portion of the free end of each arm 54 may be beveled off at 55 to correspond to the curvature 29 of its rotor when the arm is engaged against the rotor during the first half of the expansion movement thereof, thus providing these elements with maximum cooperating bearing faces during the period of greatest pressure whereby to hold the pressure of burning gases and prevent excessive wear. The inner surface of each arm is also curved at 31 and 41 respectively adjacent to the free end thereof and more closely adjacent to the pivotal axis 52 to correspond to the curves 30 and 29 on the rotor, whereby to form bearing surfaces between the rotor and arm during outward pivotal movement of the arms and to hold the arms firmly closed over the openings into the combustion chambers when the rotors are located thereover. The exhaust valves 46 are not opened until the compression arms reach their maximum open position, which is near the point of maximum expansion of the burning gases, thus utilizing the maximum effort thereof in rotating the shaft 24. Furthermore, since an ignition takes place every 60° of shaft rotation, it will be seen that a continuous and relatively even flow of power is directed to the rotating of the shaft as each explosion overlaps the next two succeeding ignitions and expansions. It will also be noted that the scavenging of the exhaust gases is very complete since such gases are swept around the cylinders and squeezed out of the exhaust ports without being forced back into the combustion chambers. Also the ports 74 start to open before the arms 54 of the corresponding combustion chambers are forced to the closed position, thus permitting a more complete scavenging of the dead gases from the combustion chamber 42.

The rotors permit a slight dwell of the compression arms as the arms reach the maximum open position, which dwell allows the inertia of the incoming gas more completely to fill the compression chambers 60. Each port 74 closes just after the compression arm feeding it has been completely closed, thus utilizing the inertia of the compressed mixture to provide a maximum filling of the combustion chamber. It will also be noticed that each compression arm is held closed for a considerable portion of the rotor rotation, thus giving the necessary time for filling the combustion chamber and igniting the charge. It may be desirable to provide auxiliary means, such as springs 99, to aid in starting the engine, these springs serving to normally move the arms 54 inwardly.

Ignition of a combustion charge takes place in chamber 42 immediately as rotor surface 29 begins its contact with arm surface 55 (full lines, Fig. 2) and the corresponding arm 54 is thereupon forced inwardly against the rotor in a manner propelling the rotor forwardly. During such propulsion the surface 55 of the arm forms a suitable bearing and sealing contact for the arm against the surface 29 and the rotor is driven forwardly by the pressure of the arm on the surface 29 and the pressure of the expanding gas on such surface as the latter slides from beneath the surface 55. The propelling action of the arm continues until the surface 55 reaches that portion of the surface 29 most closely adjacent to the shaft 24. The propelling action of the expanding gas, however, continues even beyond such time as is indicated by the full lines in Fig. 2, and the length of the arm as heretofore described and the concavity of its inner surface contribute to this action by contacting the arm with the rotor surface 29 at a point considerably in advance of or beyond the shaft 24 and by exposing a maximum portion of the surface 29 to the action of the expanding gas.

When the rotor has reached the position illustrated in full lines as in Fig. 2, the forward portion of the surface 29 acts to force the left hand arm 54 outwardly and during such action the surface 29 rides against the curved portion 41 of the arm. The expanding gas rearwardly of the rotor is driving the rotor forwardly, and it will be noted that the extent of the surface 30 is such as fully to span the gap 41 and thereby prevent any leakage of the gas past the rotor through such gap. Thereafter the surface 30 rides on to the corresponding surface 31 and holds the arm firmly on its seat for a relatively long period during which a charge of gas is forced under pressure into the chamber 42.

Figure 6:
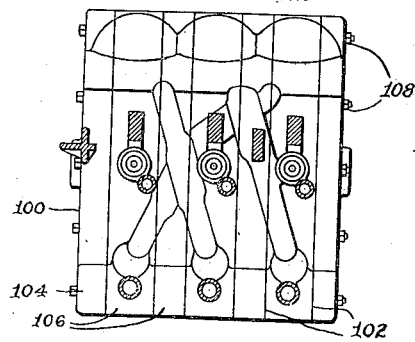
Fig. 6 is a plan view similar to Fig. 3 and showing a modification thereof.

It will be understood that we have herein shown and described a specific engine only for purposes of illustrating our invention and that we have no intention of limiting the invention to the details thereof except as required by the appended claims. For instance, the engine may be constructed with any desired number of cylinders and compression arms; valves most suitable for the purpose may be used and operated in any convenient manner; the piping 68—72 may be arranged to convey the compressed gases to the combustion chambers in the order found most suitable and efficient; and the engine block can be constructed in sections longitudinally of the shaft 24, as shown in Fig. 2, or in any other convenient manner. In Fig. 6, we have, for example, illustrated how the engine block may be constructed in sections 100 divided transversely of the shaft 24, the lines 102 of division being located intermediate the water chambers 104 and the cylinders 106, and the sections being held in assembled relation by bolts 108. It should also be understood that while our engine will ordinarily be so constructed that the engine block is stationary and the shaft 24 rotates, it is entirely within the scope of the invention to reverse this arrangement and make the engine block the rotary member.

Having thus described our invention, what we claim as new and desire to secure by Letters Patent is:

1. A rotary internal combustion engine, comprising a block having a cylinder therein, a shaft disposed centrally in the cylinder, a rotor in the cylinder mounted eccentrically on the shaft and contacting with the inner walls of the cylinder, an arm pivotally mounted on the peripheral wall of the cylinder in engagement with the parallel side walls thereof and movable between a closed position wherein its rear surface is adjacent to said peripheral wall and an open position extending inwardly into the cylinder, the arm having an arcuate projection extending outwardly from its said rear surface and into the cylindrical block, the arm together with its said projection and the adjacent cylinder walls forming a compression chamber within the cylinder when the arm is in open position, and means providing a combustion chamber within the engine block and opening into the cylinder on the side of the arcuate projection opposite from the compression chamber, explosive pressure within the combustion chamber being adapted to swing the arm inwardly against the rotor and cause forward rotation of the shaft and the influx of a combustion charge into the compression chamber and continued forward rotation of the shaft being adapted to swing the arm in the opposite direction and compress said charge, the length of the arm from its pivotal axis to its outermost point of engagement with the rotor being substantially greater than the distance between its pivotal axis and the rotary axis of the shaft for the purpose described.

2. A rotary internal combustion engine, comprising a block having a cylinder therein, a shaft disposed centrally in the cylinder, a rotor mounted eccentrically on the shaft and having an outer peripheral portion contacting with the inner curved wall of the cylinder and defining a circular path upon rotation of the rotor, the cylinder block having a combustion chamber located therein and opening into the cylinder, and an arm hinged to the block and movable between a closed position adjacent to the curved peripheral wall of the cylinder and an open position extending inwardly into the cylinder, the arm in its open position and the cylinder walls forming a compression chamber beneath the arm and within the cylinder and said path and the arm in its closed position covering the opening from the combustion chamber, explosive pressure within the combustion chamber being adapted to swing the arm inwardly against the rotor and cause forward rotation of the shaft and expanding of the compression chamber, and continued forward rotation of the shaft being adapted to swing the arm in the opposite direction and contract the compression chamber and close the arm over said opening.

3. A rotary internal combustion engine comprising a block having a plurality of cylinders in alignment therein, a shaft disposed centrally through the cylinders, a rotor in each cylinder mounted eccentrically on the shaft and having the outermost portion of its periphery curved to engage the curved inner wall of its cylinder and having a relatively longer curved peripheral portion extending from the first named portion inwardly of the cylinder and around the shaft, an arm in each cylinder pivotally mounted on said wall, means providing independent compression and combustion chambers rearwardly of each arm, the compression chambers being nearer the pivotal axes of the arms and the combustion chambers having openings into the cylinders which openings are closed by the arms in their outermost position, means providing intake ports into the compression chambers, means providing a conduit from each compression chamber to the combustion chamber of another cylinder, valves for controlling the flow of fuel through the conduits into the combustion chambers, explosive pressure in the combustion chambers being adapted to swing the arms inwardly against the relatively longer curved peripheral portions of the rotors at one side of the points thereon most closely adjacent to the axis of shaft rotation and cause forward rotation of the shaft and the influx of combustion charges into the compression chambers, and continued forward rotation of the shaft being adapted to engage said peripheral portions at the other side of said points with the arms and swing the arms outwardly and compress said charges and close the arms over the openings of the combustion chambers, and means operated from said shaft for opening each of said valves substantially as the arm closes over the corresponding combustion chamber.

4. The combination defined in claim 3 wherein the last named means opens each said valve slightly prior to the complete closing of the arm over the corresponding combustion chamber, whereby more completely to scavenge dead gases from the combustion chambers.

5. A rotary internal combustion engine comprising a block having a cylinder therein, a shaft disposed centrally in the cylinder, a rotor mounted eccentrically on the shaft and having the outermost portion of its periphery curved to engage the curved inner wall of the cylinder, means providing a branch compression chamber within the cylinder block, a bifurcated arm pivotally movable in the cylinder about the outer end of one branch thereof and having its other branch extending into and forming a piston slidable within said branch chamber as the arm thus pivotally moves, the arm being adapted to engage the periphery of the rotor and forming a compression chamber with the cylinder walls between said two arm branches, means providing an intake port into the compression chamber and its branch, and means providing a combustion chamber in communication with the cylinder outside the compression chamber, explosive pressure within the combustion chamber being adapted to swing the arm inwardly against the rotor and cause forward rotation of the shaft and the influx of a combustion charge into the compression chamber, and continued forward rotation of the shaft being adapted to swing the arm in the opposite direction and compress said charge.

6. A rotary internal combustion engine, comprising a block having a cylinder therein, a shaft disposed centrally in the cylinder, a rotor mounted eccentrically on the shaft and contacting with the inner walls of the cylinder, an arm pivotally mounted on the peripheral wall of the cylinder in engagement with the parallel side walls thereof and movable between a closed position adjacent to the peripheral wall and an open position extending inwardly into the cylinder, means including the arm providing a compression chamber rearwardly of the arm and an arcuate branch compression chamber in communication therewith, the arm having an arcuate projection extending outwardly from its rear surface and into said branch chamber and acting as a piston therein, and means providing a combustion chamber within the engine block and opening into the cylinder on the side of the arcuate projection opposite from the compression chamber, explosive pressure within the combustion chamber being adapted to swing the arm inwardly against the rotor and cause forward rotation of the shaft and the influx of a combustion charge into the compression chamber and continued forward rotation of the shaft being adapted to swing the arm in the opposite direction and compress said charge, the length of the arm from its pivotal axis to its outermost point of engagement with the rotor being substantially greater than the distance between its pivotal axis and the rotary axis of the shaft for the purpose described.

7. A rotary internal combustion engine, comprising a block having a cylinder therein, a shaft disposed centrally of the cylinder, a rotor mounted eccentrically on the shaft and having its sides and an outermost curved peripheral portion contacting with the inner walls of the cylinder and a second curved peripheral portion extending more closely adjacent to the axis of the shaft, an arm pivotally mounted on the peripheral wall of the cylinder in engagement with the side walls thereof and movable between a closed position adjacent to said peripheral wall and an open position extending inwardly into the cylinder, the inner surface of the arm being in the form of an arcuate curve adjacent to the free end thereof and in the form of a second arcuate curve more closely adjacent to the pivotal axis, means providing compression and combustion chambers rearwardly of the arm, the combustion chamber having an opening into the cylinder, explosive pressure within the combustion chamber being adapted to swing the arm inwardly against the rotor and cause forward rotation of the shaft and the influx of a combustion charge into the compression chamber and continued forward rotation of the shaft being adapted to engage said second curved peripheral portion of the rotor with the second arcuate curve of the arm whereby to swing the arm in the opposite direction and compress said charge, and continued forward rotation of the rotor being adapted to engage said outermost curved peripheral portion of the rotor with the first-named arcuate curve on the arm and thereby hold the arm closed over the combustion chamber opening.

8. A rotary internal combustion engine, comprising a block having a cylinder therein, a shaft disposed centrally in the cylinder, a rotor on the shaft in the cylinder and having the outermost portion of its periphery curved to engage the curved inner wall of the cylinder and having a second curved peripheral portion extending from both ends of the first named portion inwardly of the cylinder around and closely adjacent to the shaft, a pair of oppositely disposed arms movable inwardly into contact with the rotor about their outer ends pivoted to the cylinder wall, each arm having a rotor engaging surface adjacent to its free end and the length of each arm from its pivotal axis to said rotor engaging surface being substantially greater than the distance between its pivotal axis and the rotary axis of the shaft whereby during the inward and power stroke of the arm to engage the rotor beyond the shaft axis and provide relatively long and substantially overlapping power strokes on the rotor, and means providing oppositely disposed combustion chambers in communication with the cylinder when the arms are pivoted inwardly away from the wall of the cylinder, the arms closing the said communications when in their outermost position, explosive pressure within the combustion chambers being adapted to swing the arms inwardly and contact their free end portions with the rotor beyond the shaft axis and cause forward rotation of the shaft.

9. A rotary internal combustion engine, comprising a block having a plurality of cylinders in alignment therein, a shaft disposed centrally through the cylinders, a rotor in each cylinder mounted eccentrically on the shaft and contacting with the cylinder walls, an arm in each cylinder movable inwardly into contact with the rotor about one end pivoted to the cylinder wall, the length of each arm from its pivotal axis to its outermost point of engagement with the rotor being substantially greater than the distance between its pivotal axis and the rotor axis of the shaft, means providing independent compression and combustion chambers rearwardly of each arm, the compression chambers being nearer the pivotal axes of the arms and the combustion chambers having openings into the cylinders which openings are closed by the arms in their outermost position, means providing intake ports into the compression chambers, means providing a conduit from each compression chamber to the combustion chamber of another cylinder, explosive pressure in the combustion chambers being adapted to swing the arms inwardly against their rotors to drive the rotors forwardly and cause the influx of combustion charges into their compression chambers, and continued forward rotation of the shaft being adapted through the rotors to swing the arms outwardly and compress said charges and close the arms over the openings of the combustion chambers.

10. A rotary internal combustion engine, comprising a block having a plurality of cylinders therein, a shaft disposed centrally through the cylinders, a rotor in each cylinder mounted eccentrically on the shaft and having the outermost portion of its periphery curved to engage the curved inner wall of its cylinder and having a second curved peripheral portion extending from the first-named portion inwardly of the cylinder and around the shaft, said second curved portion extending more than 180 degrees around the rotor, an arm in each cylinder pivotally mounted on said wall, means providing compression and combustion chambers in the cylinder block rearwardly of each arm, each compression chamber being nearer the pivotal axis of its arm and the combustion chamber having an opening into the cylinder which opening is closed by the arm in its outermost position, means providing an intake port into each compression chamber, explosive pressure in a combustion chamber being adapted to swing its arm inwardly against said second curved peripheral portion of its rotor on one side of the point thereon most closely adjacent to the axis of shaft rotation and cause forward rotation of the shaft and the influx of a combustion charge into the compression chamber, and continued forward rotation of the shaft being adapted to engage said peripheral portion at the other side of said point with the arm and swing the arm outwardly and compress said charge, and means for conducting each compressed charge to the combustion chamber of another cylinder, said second curved peripheral portion of each rotor cooperating with its arm to perform the driving and compressing operations uniformly and the length of each arm from its pivotal axis to its outermost point of engagement with the rotor being substantially greater than the distance between its pivotal axis and the rotary axis of the shaft.

JOHN N. HINCKLEY.
STANLEY H. CLARK.